United States Patent [19]

Shafir

[11] Patent Number: 5,477,371
[45] Date of Patent: Dec. 19, 1995

[54] THREE-DIMENSIONAL, NON-CONTACT SCANNING APPARATUS AND METHOD

[75] Inventor: Aaron Shafir, Tel Aviv, Israel

[73] Assignee: Shafir Production Systems Ltd., Raanana, Israel

[21] Appl. No.: 165,616

[22] Filed: Dec. 13, 1993

[51] Int. Cl.[6] .................................................. G02B 26/08
[52] U.S. Cl. ........................... 359/201; 359/213; 359/226; 356/376; 128/779
[58] Field of Search ..................................... 359/212–214, 359/201–203, 225–226, 394, 199, 198, 223; 250/560, 561, 563, 234; 356/376, 380; 33/3 R, 511, 512, 515; 128/779; 364/564

[56] References Cited

U.S. PATENT DOCUMENTS

| | | | |
|---|---|---|---|
| 4,745,290 | 5/1988 | Frankel et al. ...................... | 250/559.17 |
| 5,103,338 | 4/1992 | Crowley et al. ...................... | 359/394 |
| 5,128,880 | 7/1992 | White ...................... | 356/376 |
| 5,371,375 | 12/1994 | Stern et al. ...................... | 356/376 |

*Primary Examiner*—James Phan
*Attorney, Agent, or Firm*—Benjamin J. Barish

[57] ABSTRACT

A three-dimensional, non-contact scanning apparatus for scanning an object, particularly a foot, includes a holder for the object to be scanned, a main carriage movable linearly towards and away from the holder and the object when held thereon, a rotatable carriage rotatably mounted on the main carriage and formed with an opening for accommodating the holder and the object when held thereby, and an optical-beam scanner carried by the rotatable carriage to rotate therewith so as to scan the object by an optical beam outputted by the scanner.

20 Claims, 7 Drawing Sheets

THREE-DIMENSIONAL, NON-CONTACT SCANNING APPARATUS AND METHOD

FIELD AND BACKGROUND OF THE INVENTION

The present invention relates to a three-dimensional, non-contact scanning apparatus and method. The apparatus and method of the present invention are particularly useful for scanning and digitizing a subject's foot, and is therefore described below with respect to this application.

In the footwear industry there is a demand for equipment that can scan a subject's foot in three dimensions in order to input such information into a computer. Once the information is in the computer, the information can be advantageously utilized, for example: (1) to select the appropriate shoe size for a customer in a shoe store; (2) to produce orthopedic shoes designed exactly for a subject's foot; (3) to design a shoe and its components according to the three-dimensional configuration of a last; (4) to inspect a last for quality control; and/or (5) to provide statistical information of a large number of people in order to aid in designing better shoes.

One technique for the three-dimensional digitizing of information of an object, such as a subject's foot, is by moving a contact probe around the subject's foot. This method, however, is extremely slow for many of the applications described above.

OBJECTS AND BRIEF SUMMARY OF THE INVENTION

An object of the present invention is to provide a non-contact scanning apparatus for the three-dimensional scanning of an object, particularly of the subject's foot, which enables the foot to be scanned in a much shorter time, e.g., but a few seconds as compared to a contact type apparatus.

According to the present invention, there is provided a three-dimensional, non-contact scanning apparatus for scanning a three-dimensional object having a longitudinal axis defined by the longest dimension of the object, comprising: a holder for holding the object to be scanned; a main carriage movable linearly towards and away from the holder parallel to the longitudinal axis of the object when held thereon; a linear actuator for linearly moving the main carriage; a rotatable carriage rotatably mounted on the main carriage; a rotatable drive for rotating the rotatable carriage around the longitudinal axis of the object when held on the holder; and an optical scanner carried by the rotatable carriage to rotate therewith around the holder and the object when held thereon so as to scan the object, whereby linear movement of the main carriage moves the scanner along the length of the object when held by the holder, whereas rotation of the rotatable carriage moves the scanner around the object.

According to the preferred embodiment of the invention described below, the optical scanner outputs an optical beam in the form of a spot; also, the rotatable carriage further includes a reflector between the optical scanner and the object, and an oscillating drive for oscillating the reflector to oscillate the beam for a predetermined arc substantially parallel to the direction of linear movement of the main carriage.

According to still further features in the described preferred embodiment, the apparatus also includes an intermediate carriage pivotally mounting the rotatable carriage to the main carriage; and an actuator for pivoting the intermediate carriage, and the rotatable carriage with respect to the main carriage. The intermediate carriage and the rotatable carriage are of the configuration of coaxial rings having an inner diameter sufficiently large to enclose the object holder and an object when held thereby.

The invention is particularly useful for scanning and digitizing a subject's foot. In such an application, the object holder is a footrest for holding a subject's foot to be scanned; and the intermediate carriage is pivotally mounted at its upper end to the main carriage. The arrangement is such that the front part of the subject's foot may be scanned by the linear movement of the main carriage and the rotational movement of the rotatable carriage; and the rear part of the subject's foot, including the heel, may be scanned by the pivotal movement of the intermediate carriage and the rotational movement of the rotatable carriage.

According to another aspect of the invention, there is provided a method for the non-contact scanning of a subject's foot with the long dimension of the foot being at a predetermined direction, comprising: rotating an optical beam of a scanner around the subject's foot while linearly displacing the scanner parallel to the long dimension axis of the subject's foot to scan the front part of the subject's foot; and then rotating the optical beam of the scanner around the subject's foot while angularly displacing the scanner to scan the rear part and heel of the subject's foot. In the described preferred embodiment, during the rotation of the optical beam of the scanner around the subject's foot, the optical beam is also oscillated by a reflector along a predetermined arc substantially parallel to the direction of the linear displacement of the optical beam.

As will be described more particularly below, the apparatus and method of the present invention can be used for digitizing a foot in about three seconds, thereby enabling the apparatus and method to be used in one or more of the above-referenced applications.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
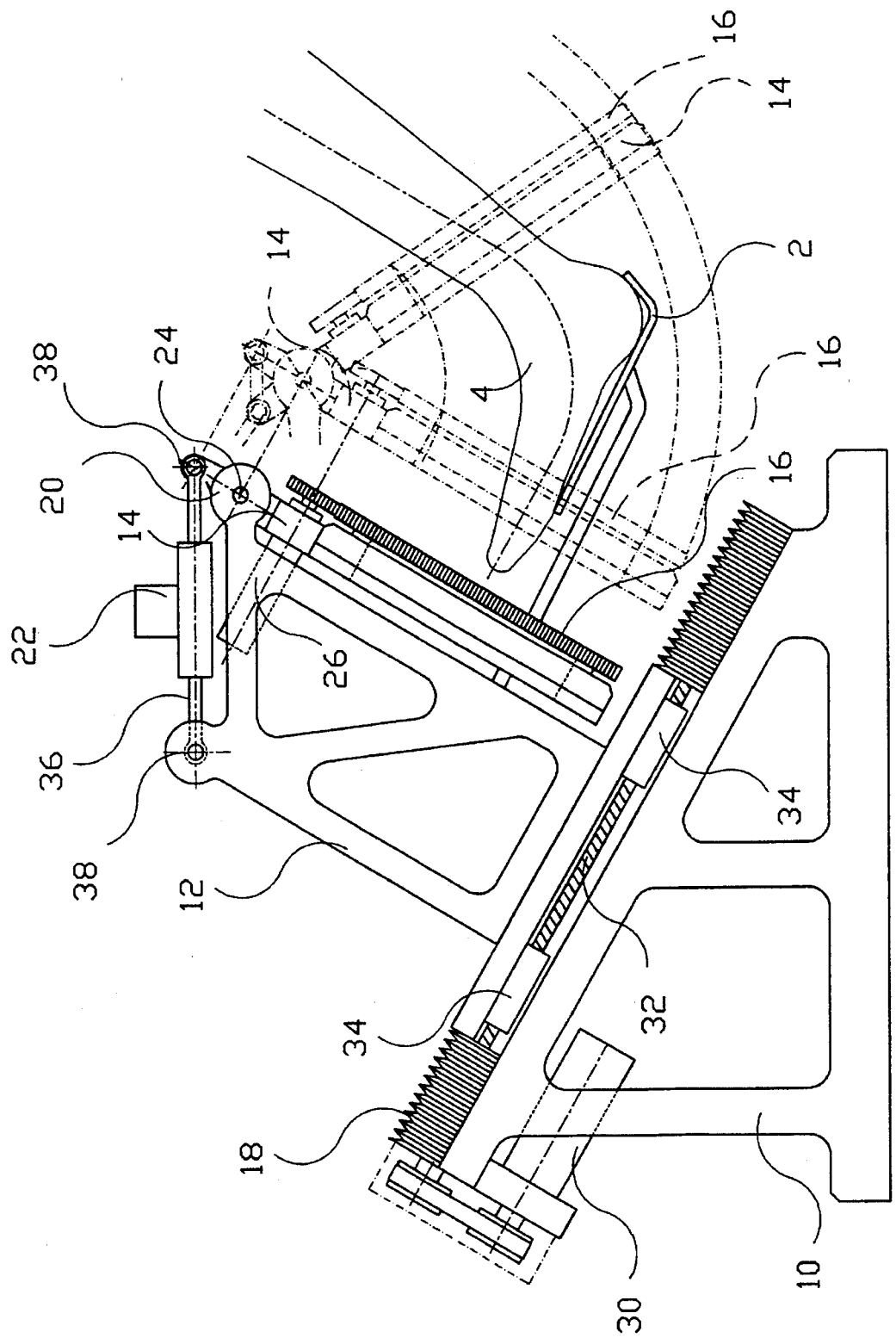
FIG. 1 is a side elevational view of one form of apparatus constructed in accordance with the present invention.

The apparatus illustrated in FIG. 1 is particularly useful for the non-contact scanning of a subject's foot in order to produce three-dimensional data of the foot's measurements, which data is inputted into a computer for further processing, recording, and/or display. The apparatus illustrated in FIG. 1 thus includes a holder 2 for holding the object to be scanned. In this case, the holder 2 is a footrest for receiving the subject's foot 4 which is to be scanned and digitized.

The apparatus illustrated in FIG. 1 includes a base 10 supporting a main carriage 12, an intermediate carriage 14, and a rotational carriage 16. Main carriage 12 is linearly movable towards and away from the footrest 2 by a linear actuator, generally designated 18. The linear actuator thus moves the main carriage 12 parallel to the longitudinal axis of the foot, defined by its longest dimension. The intermediate carriage 14 is in the configuration of a ring having an inner diameter large enough to accommodate the footrest 2, and the foot thereon, and is pivotally mounted at its upper end to the main carriage 12 by a pivotal mounting 20. The intermediate carriage 14 is pivoted by a linear actuator 22 about pivot point 24.

The rotatable carriage 16 is also in the configuration of a ring to accommodate the footrest 2 and the subject's foot 4 thereon. It is coaxial with intermediate carriage 14 and is rotatable with respect to that carriage by a drive motor 26 carried by the intermediate carriage 14. It will thus be seen that drive motor 26 also rotates rotatable carriage 16 around the longitudinal axis (defined by the longest dimension) of the foot when received on the footrest 2.

As will be described more particularly below, the rotatable carriage 16 carries a laser scanner, shown at 28 in FIG. 2, for scanning the subject's foot 4 on the footrest 2.

The linear actuator 18 for linearly moving the main carriage 12 includes a step motor 30 rotating a ball screw 32 threaded within a pair of nuts 34 secured to the main carriage. Thus, stepping motor 30 in one direction advances the main carriage 12 towards the footrest 2, and stepping it in the opposite direction, retracts the main carriage from the footrest.

Linear actuator 22, which pivotally mounts the intermediate carriage ring 14 to the main carriage 12 about pivot point 20, is carried by a link 36 pivotally mounted at 38 to the main carriage 12. The opposite end of link 36 is pivotally mounted to the intermediate carriage 14 at pivot point 38, so that actuation of the linear actuator motor 22 changes the effective length of link 36, to thereby pivot the intermediate carriage about pivot point 24. Linear actuator 22 may thus pivot the intermediate carriage 14, and the rotatable carriage 16 carried thereon, through an arc of up about 90°, as shown by the two broken-line positions of carriages 14 and 16 in FIG. 1.

Figure 2:
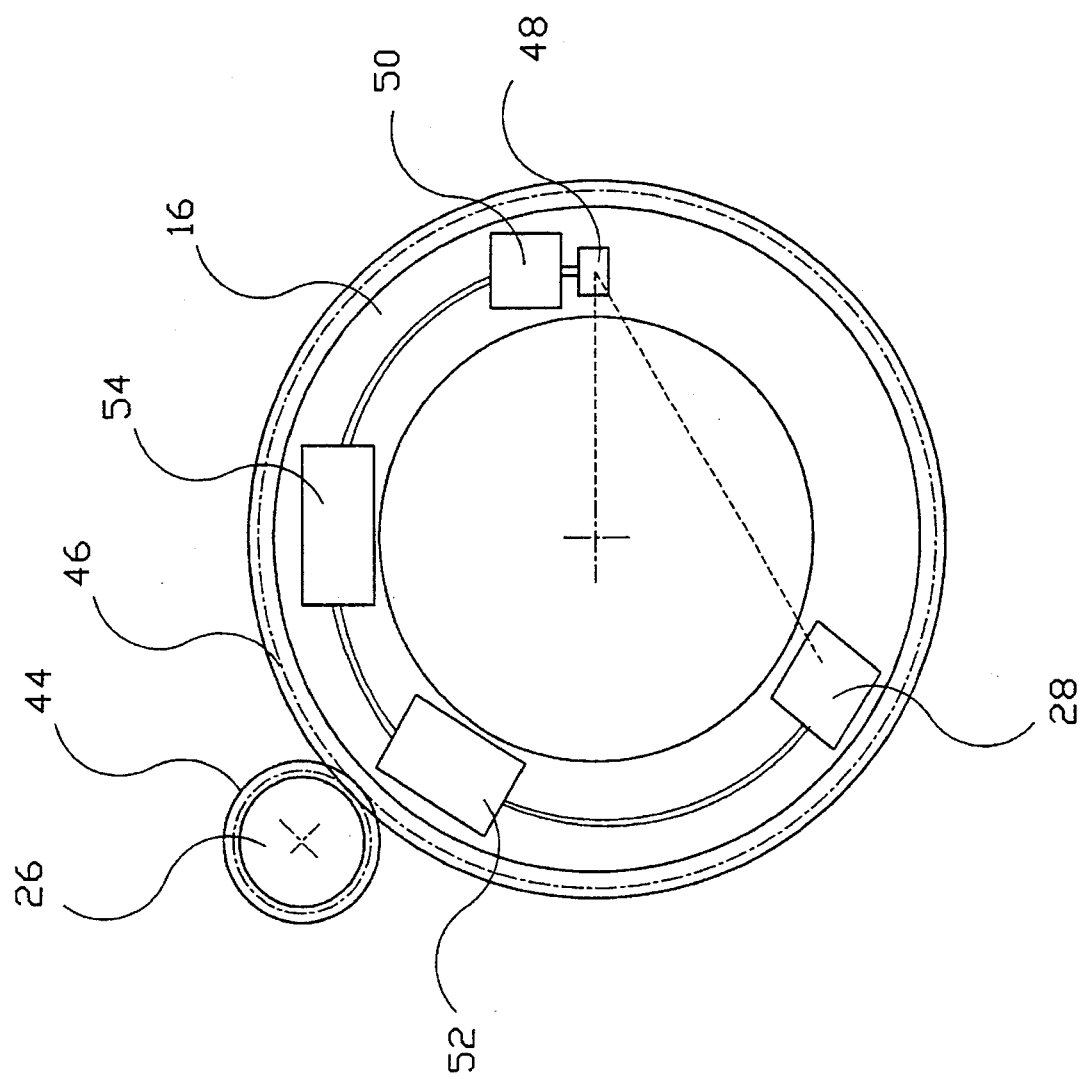
FIGS. 2, 3 and 4 diagrammatically illustrate the mounting of the rotational carriage on the intermediate carriage, and the pivotal mounting of the intermediate carriage on the main carriage, in the apparatus of FIG. 1.
Figure 3:
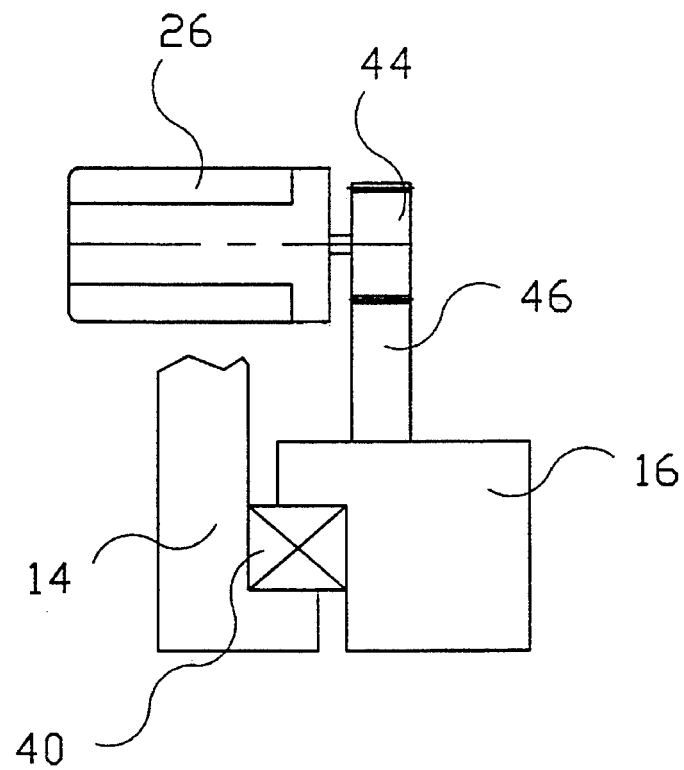
Figure 4:
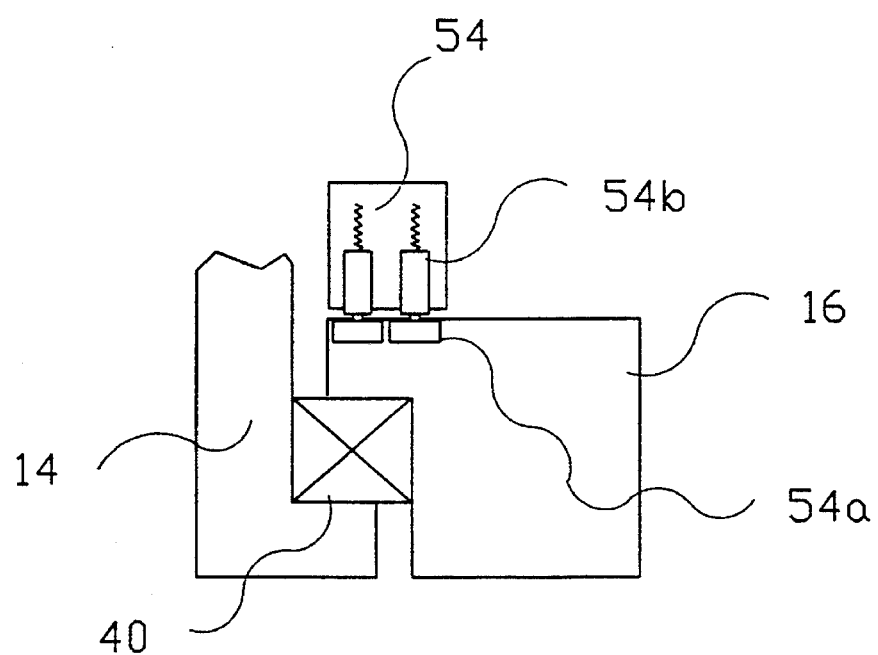

The rotatable carriage 16, rotatably mounted on the intermediate carriage 14, is more particularly illustrated in FIGS. 2–4. It is supported on the intermediate carriage 14 by a bearing 40 (FIGS. 3, 4) and is rotated by means of electric motor 26, which rotates a gear 44 meshing with a gear 46 carried by the rotatable carriage.

Rotatable carriage 16 carries the previously-mentioned laser scanner 28 (FIG. 2). It also carries a mirror 48 which is oscillated through a predetermined arc by another motor 50 also carried on the rotatable carriage 16. Mirror 48 is located to receive the laser beam exiting from the laser 28 and to reflect the beam towards the subject's foot 4 on the footrest 2 in order to effect the scanning of the foot by the laser beam. As will be described more particularly below, mirror 48 driven by motor 50 is effective to oscillate the beam a predetermined arc generally parallel to the direction of the linear displacement of the optical beam by the linear displacement of the main carriage 12, to thereby permit the laser beam to scan a relatively wide region during each linear displacement of the main carriage.

The predetermined angle of oscillation of mirror 48 is preferably from 10°–30°. In the example described herein, it is preferably 15°.

Laser scanner 28 is actually a laser-type range finder, or distance-measuring device, which measures the point in space of the surface of the subject's foot 4 impinged by the laser beam. Such laser-type distance measuring devices are well known and commercially available. A preferred device is the LB Series of laser displacement scanners supplied by Keyence Corporation, of Osaka, Japan.

The rotatable carriage 16 further carries a controller 52, which receives electrical output from the laser scanner 28 and outputs the same from the apparatus via a slip-ring distributor 54. Such a slip-ring distributor is diagrammatically illustrated in FIG. 4, wherein it will be seen that it includes a plurality of slip-rings 54a carried by the rotatable carriage 16 engaged by a plurality of spring-urged brushes 54b carried by the intermediate carriage 14. Slip-ring distributor 54 also supplies power to laser 28 and motor 50 mounted on the rotational carriage 16.

Figure 5:
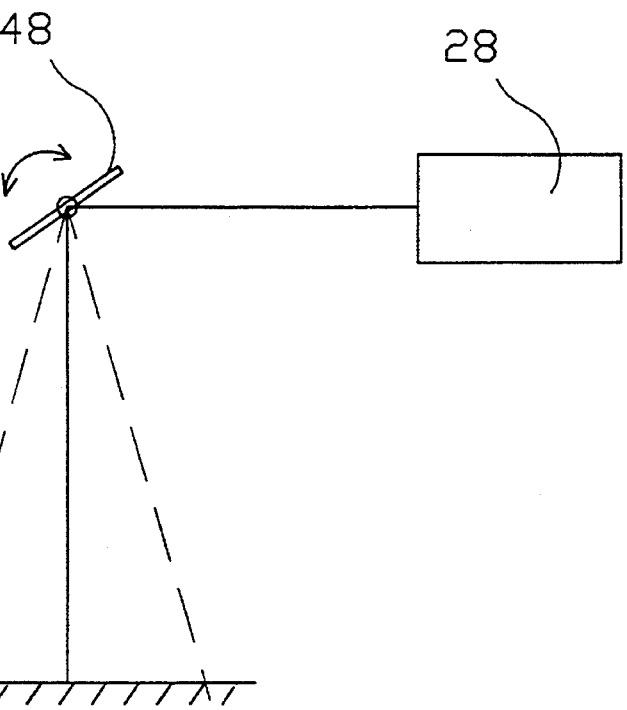
FIG. 5 diagrammatically illustrates the operation of the laser scanner in the apparatus of FIG. 1.
Figure 6:
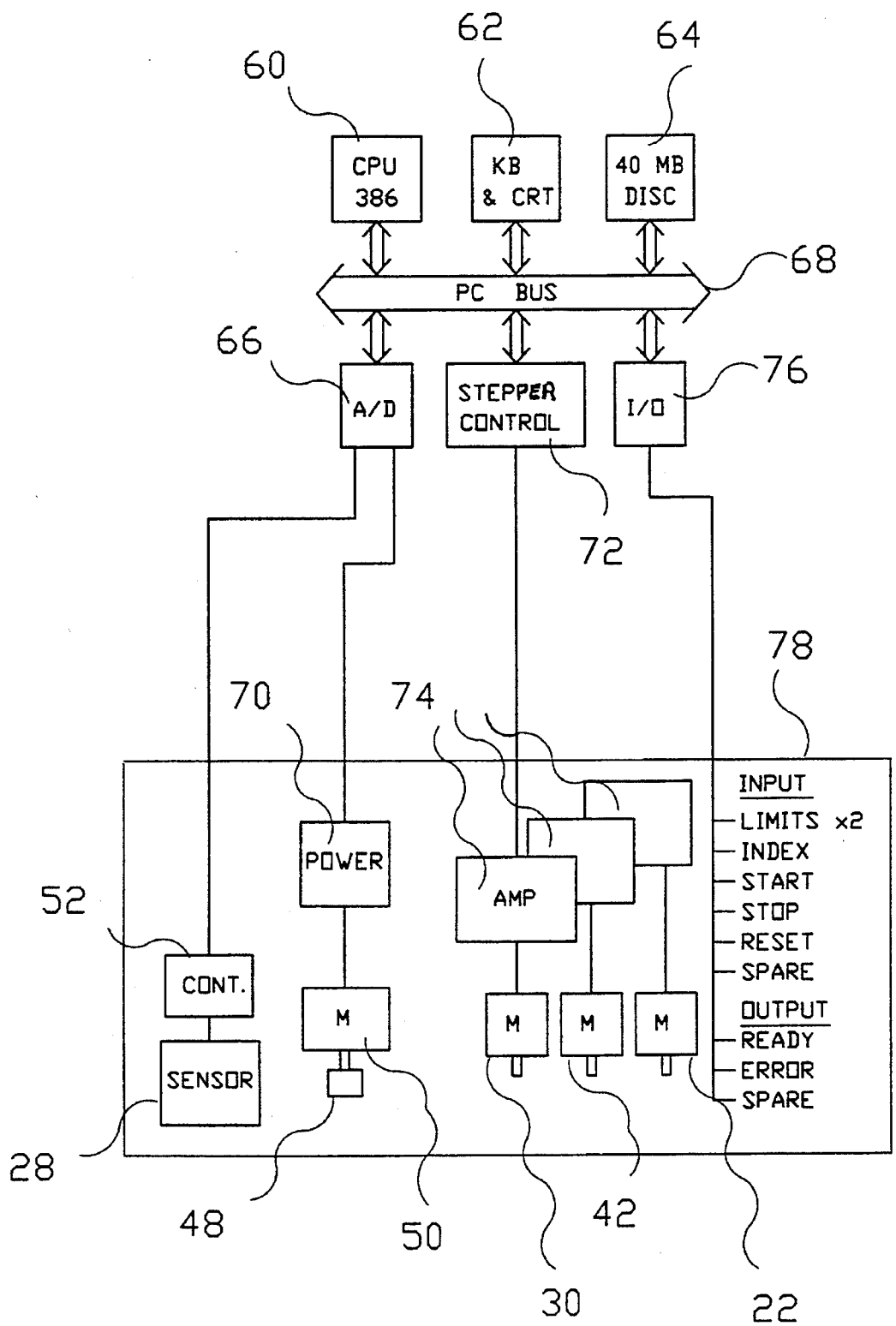
FIG. 6 is a block diagram illustrating the electrical system in the apparatus of FIG. 1.

The electrical system for controlling the apparatus illustrated in FIG. 1 is shown in the block diagram of FIG. 6. Thus, the apparatus may include a standard PC computer including a CPU (central processing unit) 60; a keyboard input and a display output, together shown by block 62; and a hard disk memory 64, e.g., of 40 MB. The foregoing elements communicate with the laser scanner 28 and the controller 52 mounted on the rotatable carriage 16 via an A/D (analog-to-digital) converter 66 and a PC bus 68. The computer also communicates via A/D converter 66 and PC bus 68 with motor 50 which is carried by the rotatable carriage 16 and which oscillates the mirror 48 as described above and as illustrated in FIG. 5. The power circuit to motor 50 is schematically shown at 70 in FIG. 6.

Motor 30 which linearly displaces the main carriage 12, motor 42 which rotates the rotary carriage 16, and motor 22 which pivots the intermediate carriage 14, are all controlled from the computer via the bus 68, a stepper control circuit 72, and amplifiers 74. The control of these motors, as well as of the mirror-oscillating motor 50, is described more particularly below with respect to FIGS. 8 and 9.

Figure 7:
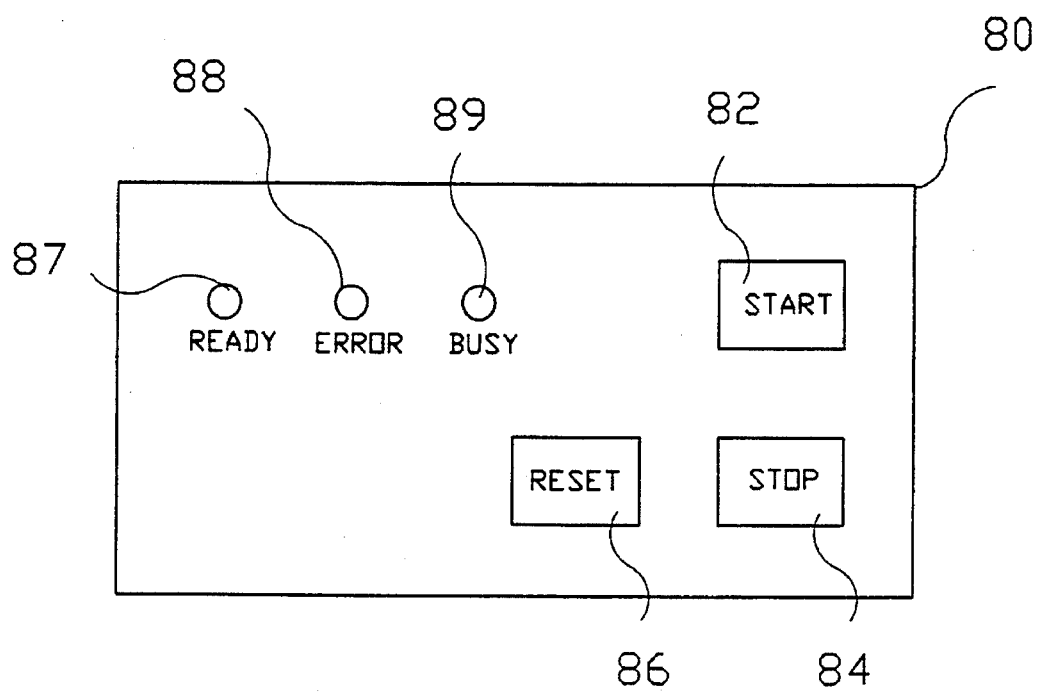
FIG. 7 illustrates the control panel in the apparatus of FIG. 6.

The electrical system illustrated in FIG. 6 further includes an input/output board 76 which controls the various inputs and outputs, e.g., as shown in block 78 in FIG. 6. These are fairly standard controls in such systems, and therefore are not described herein in detail. Some of these controls are illustrated in the control panel 80 shown in FIG. 7, e.g., the Start button 82, Stop button 84 and Reset button 86. Control panel 80 in FIG. 7 also shows some of the indicators which would normally be included in such a system, particularly the Ready indicator 87, the Error indicator 88, and the Busy indicator 89.

Figure 8:
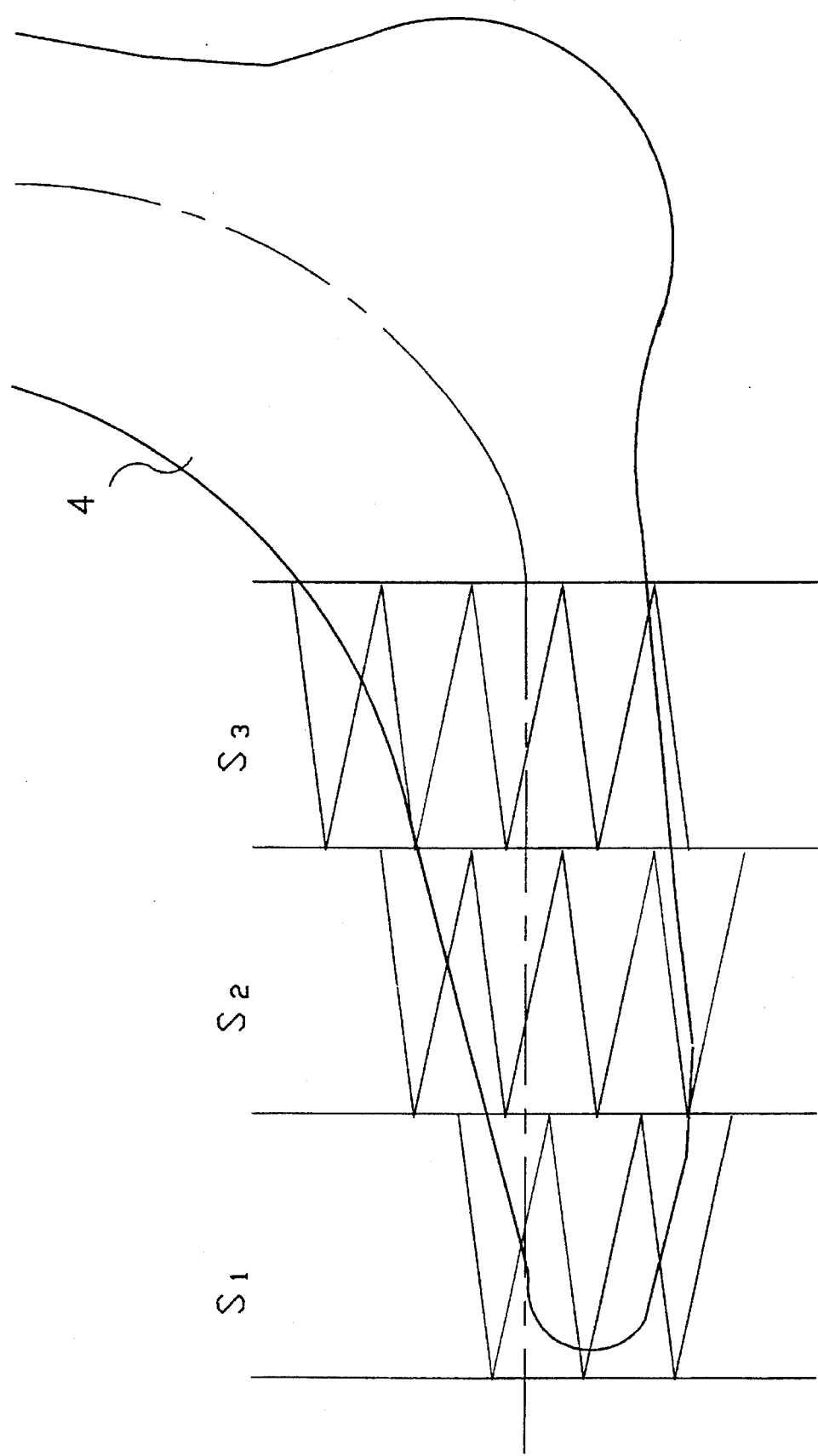
FIGS. 8 and 9 diagrammatically illustrate the path of the laser beam during the operation of the apparatus of FIG. 1 to scan a subject's foot.
Figure 9:
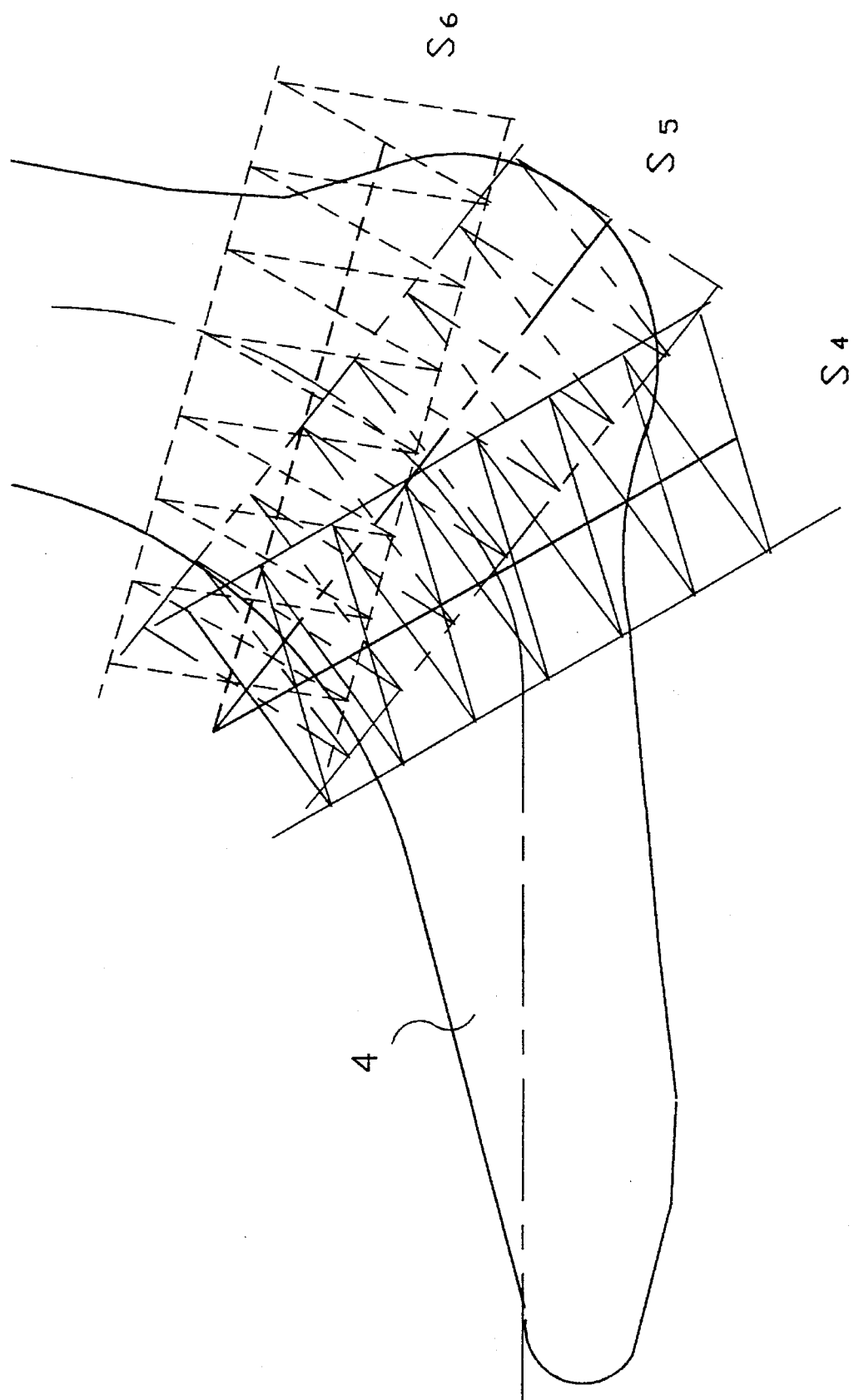

FIGS. 8 and 9 illustrate the operation of the system and the manner in which the subject's foot 4 on the footrest 2 is scanned by the laser scanner 28.

The apparatus is operated in two stages for scanning a subject's foot 4. In the first stage, the front part of the subject's foot is scanned in three steps $S_1$, $S_2$, $S_3$ in the manner illustrated in FIG. 8; and in the second stage, the rear part of the subject's foot, including the heel and the ankle, is scanned in three additional steps $S_4$, $S_5$, $S_6$, as illustrated in FIG. 9.

In the first stage as illustrated in FIG. 8, the main carriage 12 is advanced linearly by motor 30 to bring the laser beam from the laser scanner 28 just in front of the subject's foot 4 as shown in FIG. 8. The main carriage 12 is then displaced linearly by motor 30 one step $S_1$, equal to about 50 mm, as motor 42 rotates the rotatable carriage 16, and as the oscillating motor 50 oscillates the mirror 48 carried by the rotatable carriage. Thus, rotating carriage 16 rotates the laser beam circumferentially around the subject's foot, whereas oscillating mirror 48 oscillates the beam substantially parallel to the linear direction of step $S_1$ to thereby scan an annular ring around the subject's foot occupied by step $S_1$ as shown in FIG. 8.

After this annular ring has been scanned, the main carriage 12 is stepped linearly another step, as the rotatable carriage 16 is rotated and the mirror 48 is oscillated, thereby causing the laser beam from the laser scanner 28 to scan another annular ring illustrated by step $S_2$ in FIG. 8. The same operation is repeated for step $S_3$.

After the step $S_3$ has been completed, the intermediate carriage 14 carrying the rotatable carriage 16 is pivoted about pivot point 24 by motor 22, to the rightmost broken-line position illustrated in FIG. 1. During this pivotal movement of the intermediate carriage 14 and the rotatable carriage 16, the rotatable carriage is also rotated by its motor 42, and the mirror 52 is also oscillated by its motor 50, so that the rear part of the subject's foot, including the heel and ankle, is again scanned in the same manner as described above, but in an arcuate direction, rather than in a linear direction, as shown by steps $S_4$, $S_5$ and $S_6$ in FIG. 9.

In one example, each of the steps $S_1$–$S_6$ may be of a length of about 50 mm and may have a duration of about 0.5 sec. Thus, the complete foot can be scanned in about three seconds.

While the invention has been described with respect to one preferred embodiment, it will be appreciated that this is set forth merely for purposes of example, and that other variations, modifications and applications of the invention may be made.

What is claimed is:

1. A three-dimensional, non-contact scanning apparatus for scanning a three-dimensional object having a longitudinal axis defined by the longest dimension of the object, comprising:

a holder for holding the object to be scanned;

a main carriage movable linearly towards and away from said holder parallel to the longitudinal axis of the object when held thereon;

a linear actuator for linearly moving said main carriage;

a rotatable carriage rotatably mounted on said main carriage;

a rotatable drive for rotating said rotatable carriage around the longitudinal axis of the object when held on said holder;

and an optical scanner carried by said rotatable carriage to rotate therewith around said holder and the object when held thereon so as to scan the object, whereby linear movement of said main carriage moves the scanner along the length of said object when held by said holder, whereas rotation of said rotatable carriage moves the scanner around the object.

2. The apparatus according to claim 1, wherein said optical scanner outputs an optical beam in the form of a spot; and wherein said rotatable carriage further includes a reflector between said optical scanner and said object, and an oscillating drive for oscillating said reflector to oscillate said beam for a predetermined arc substantially parallel to the direction of linear movement of the main carriage.

3. The apparatus according to claim 2, wherein said predetermined arc is 10°–30°.

4. The apparatus according to claim 1, wherein said rotatable carriage is formed with an opening for accommodating the holder and an object when held thereon.

5. The apparatus according to claim 1, wherein said rotatable carriage is in the form of a ring rotatably mounted with respect to said main carriage to enclose said holder and the object when held thereon.

6. The apparatus according to claim 5, further including an intermediate carriage pivotally mounting said rotatable carriage to said main carriage; and an actuator for pivoting said intermediate carriage, and said rotatable carriage, with respect to said main carriage.

7. The apparatus according to claim 6, wherein said intermediate carriage and said rotatable carriage are of the configuration of coaxial rings having an inner diameter sufficiently large to enclose said object holder and the object when held thereon.

8. The apparatus according to claim 7, wherein said object holder is a footrest for holding a subject's foot to be scanned; said intermediate carriage being pivotally mounted at its upper end to said main carriage such that the front part of the subject's foot may be scanned by the linear movement of said main carriage and the rotational movement of said rotatable carriage; and the rear part of the subject's foot, including the heel, may be scanned by the pivotal movement of said intermediate carriage and the rotational movement of said rotatable carriage.

9. The apparatus according to claim 1, wherein said optical scanner is a laser scanner.

10. The apparatus according to claim 1, further including a data processor for converting the output of said optical scanner to digitized three-dimensional data.

11. A three-dimensional, non-contact scanning apparatus for scanning an object, comprising:

a holder for holding the object to be scanned;

a main carriage movable linearly towards and away from the holder and the object when held thereon;

a rotatable carriage rotatably mounted on said main carriage;

and an optical-beam scanner carried by said rotatable carriage to rotate therewith around said holder and the object when held thereon so as to scan the object by an optical beam outputted by said scanner;

said rotatable carriage including a reflector between said scanner and said object, and an oscillating drive for oscillating said reflector to oscillate said beam for a predetermined arc substantially parallel to the direction of linear movement of the main carriage.

12. The apparatus according to claim 11, wherein said predetermined arc is 10°–30°.

13. The apparatus according to claim 11, wherein said rotatable carriage is in the form of a ring rotatably mounted with respect to said main carriage to enclose said holder and the object held thereon.

14. The apparatus according to claim 13, further including an intermediate carriage pivotally mounting said rotatable carriage to said main carriage; and an actuator for pivoting said intermediate carriage, and said rotatable carriage, with respect to said main carriage.

15. The apparatus according to claim 14, wherein said intermediate carriage and said rotatable carriage are of the configuration of coaxial rings having an inner diameter sufficiently large to enclose said object holder and the object when held thereon.

16. The apparatus according to claim 15, wherein said object holder is a footrest for holding a subject's foot to be scanned; said intermediate carriage being pivotally mounted at its upper end to said main carriage such that the front part of the subject's foot may be scanned by the linear movement of said main carriage and the rotational movement of said rotatable carriage; and the rear part of the subject's foot, including the heel, may be scanned by the pivotal movement of said intermediate carriage and the rotational movement of said rotatable carriage.

17. A method for the non-contact scanning of a subject's foot with the long dimension of the foot being at a predetermined direction, comprising:

rotating an optical beam of a scanner around the subject's foot while linearly displacing the scanner parallel to the long dimension of the subject's foot to scan the front part of the subject's foot;

and then rotating the optical beam of the scanner around the subject's foot while angularly displacing the scanner to scan the rear part and heel of the subject's foot.

18. The method according to claim 17, wherein, during the rotation of the optical beam of the scanner around the subject's foot, the optical beam is also oscillated by a reflector along a predetermined arc parallel to the direction of the linear displacement of the optical beam.

19. The method according to claim 18, wherein said predetermined arc is 10°–30°.

20. The method according to claim 17, wherein said optical beam is a laser beam.

* * * * *